United States Patent
Ko et al.

(10) Patent No.: US 9,417,633 B2
(45) Date of Patent: Aug. 16, 2016

(54) SYSTEM FOR COMPENSATING DYNAMIC AND THERMAL DEFORMITY ERRORS OF LINEAR MOTION SINGLE-PLANE GANTRY STAGE IN REAL TIME, STAGE APPARATUS, MANUFACTURING THEREOF, AND MEASURING AND INSPECTION EQUIPMENT

(71) Applicant: SOONHAN ENGINEERING CORP., Sungnam (KR)

(72) Inventors: Byoung Gwan Ko, Seoul (KR); Banik Rahul, Seongnam (KR); Jong Kyu Seo, Seongnam (KR); Soo Keun Shin, Seongnam (KR); Chul Jung, Seongnam (KR); Yonk Uk Kwon, Seongnam (KR)

(73) Assignee: Soonhan Engineering Corp., Sungnam (KR)

( * ) Notice: Subject to any disclaimer, the term of this patent is extended or adjusted under 35 U.S.C. 154(b) by 23 days.

(21) Appl. No.: 14/557,869

(22) Filed: Dec. 2, 2014

(65) Prior Publication Data
US 2015/0153742 A1 Jun. 4, 2015

(30) Foreign Application Priority Data
Dec. 4, 2013 (KR) .................. 10-2013-0150059

(51) Int. Cl.
*G06F 7/00* (2006.01)
*G05D 3/12* (2006.01)
*G01D 5/00* (2006.01)
(Continued)

(52) U.S. Cl.
CPC ............... *G05D 3/12* (2013.01); *G01B 5/0014* (2013.01); *G01D 5/00* (2013.01); *G05B 19/404* (2013.01)

(58) Field of Classification Search
USPC ........................................................ 700/213
See application file for complete search history.

(56) References Cited

U.S. PATENT DOCUMENTS

| | | |
|---|---|---|
| 5,333,386 A | 8/1994 | Breyer et al. |
| 2009/0326849 A1 | 12/2009 | MacManus |

(Continued)

FOREIGN PATENT DOCUMENTS

| | | |
|---|---|---|
| JP | 2008-059016 | 3/2008 |
| JP | 2008-117968 | 5/2008 |
| KR | 10-2011-0137875 | 12/2011 |

OTHER PUBLICATIONS

European Search Report, dated Mar. 25, 2015, issued in corresponding European Application No. 14 003 962.9.

*Primary Examiner* — Kyle Logan
(74) *Attorney, Agent, or Firm* — Kenyon & Kenyon LLP

(57) ABSTRACT

In a system for compensating dynamic and thermal deformity errors of a linear motion single-plane gantry stage in real time, a stage apparatus using the system, and manufacturing, measuring, and inspecting apparatuses using the system, the system includes: a first two-dimensional position measuring unit arranged in each of two linear edge beams respectively positioned in both sides of the linear motion single-plane gantry stage for measuring the position of an X-axially movable gantry beam to provide a feedback of an X-axial motion thereof; a second two-dimensional position measuring unit for measuring the position of a Y-axially movable slider movable on the X-axially movable gantry beam to provide a feedback of a Y-axial motion thereof; a thermal fixing point provided as a thermal reference for measuring a thermal expansion of the X-axially movable gantry beam; and a compensation control unit for controlling an error motion of the linear motion single-plane gantry stage in real time by measuring dynamic and thermal deformity errors based on the data received from the first and the second two-dimensional position measuring unit.

13 Claims, 6 Drawing Sheets

(51) Int. Cl.
*G05B 19/404* (2006.01)
*G01B 5/00* (2006.01)

(56) References Cited

U.S. PATENT DOCUMENTS

2010/0066298 A1* 3/2010 Coleman .............. G01B 5/0014
318/652

2011/0061441 A1* 3/2011 Ko ......................... G01B 21/24
73/1.79
2012/0045855 A1* 2/2012 Beck ........................ G01B 7/06
438/16
2012/0099101 A1* 4/2012 Hong ................... G03F 7/70391
356/237.5
2012/0105866 A1* 5/2012 Pettersson ............ G01B 21/045
356/601

* cited by examiner

SYSTEM FOR COMPENSATING DYNAMIC AND THERMAL DEFORMITY ERRORS OF LINEAR MOTION SINGLE-PLANE GANTRY STAGE IN REAL TIME, STAGE APPARATUS, MANUFACTURING THEREOF, AND MEASURING AND INSPECTION EQUIPMENT

CROSS-REFERENCE TO RELATED APPLICATIONS

The present application claims priority to Application No. 10-2013-0150059, filed in the Republic of Korea on Dec. 4, 2013, which is expressly incorporated herein in its entirety by reference thereto.

FIELD OF THE INVENTION

The present application relates to a system for compensating dynamic and thermal deformity errors of a linear motion single-plane gantry stage in real time, a stage apparatus, manufacturing thereof, and measuring and inspection equipment, and more particularly, for example, to a system for compensating dynamic and thermal deformity errors of a linear motion single-plane gantry stage in real time, which measures a linearity and a yaw error due to motions of the linear motion single-plane gantry stage and a thermal deformity error so as to control the real-time compensation for the measured linearity, yaw and thermal deformity errors, and to a stage apparatus applying the system and manufacture thereof, and to measuring and inspection equipment therefor.

BACKGROUND INFORMATION

A linear motion single-plane gantry stage, generally referred to as an H-type gantry stage, may be used in the field of high-speed scanning requiring high static and dynamic accuracy.

In such a linear motion single-plane gantry stage, a dynamic error due to linearity and yaw errors and a thermal deformity error due to thermal expansion influence the determination of the position of the gantry stage resulting in degradation of the accuracy and also of the product quality.

In order to resolve such problems, various techniques have been proposed, but a real-time compensation has not been considered.

SUMMARY

Example embodiments of the present invention provide for accurately measuring dynamic and thermal deformity errors in a linear motion single-plane gantry stage so as to provide real-time compensation.

According to an example embodiment of the present invention, a system for compensating dynamic and thermal deformity errors of a linear motion single-plane gantry stage in real time includes: a first two-dimensional position measuring unit arranged in each of two linear edge beams respectively positioned in both sides of the linear motion single-plane gantry stage for measuring the position of an X-axially moving gantry beam to provide a feedback of an X-axial motion thereof; a second two-dimensional position measuring unit for measuring the position of a Y-axially moving slider moving on the X-axially moving gantry beam to provide a feedback of a Y-axial motion thereof; a thermal fixing point provided as a thermal reference for measuring a thermal expansion of the X-axially moving gantry beam; and a compensation control unit for controlling an error motion of the linear motion single-plane gantry stage in real time by measuring dynamic and thermal deformity errors based on the data received from the first and the second two-dimensional position measuring unit.

Thus, there is provided a system for compensating dynamic and thermal deformity errors of a linear motion single-plane gantry stage in real time, which measures a linearity and a yaw error due to motions of the linear motion single-plane gantry stage and a thermal deformity error so as to control the real-time compensation for the measured linearity, yaw and thermal deformity errors, and to a stage apparatus applying the system, and to manufacturing, measuring and inspection equipment therefor.

Further features and aspects of example embodiments of the present invention are described in more detail below with reference to the appended Figures.

DETAILED DESCRIPTION

Figure 1:
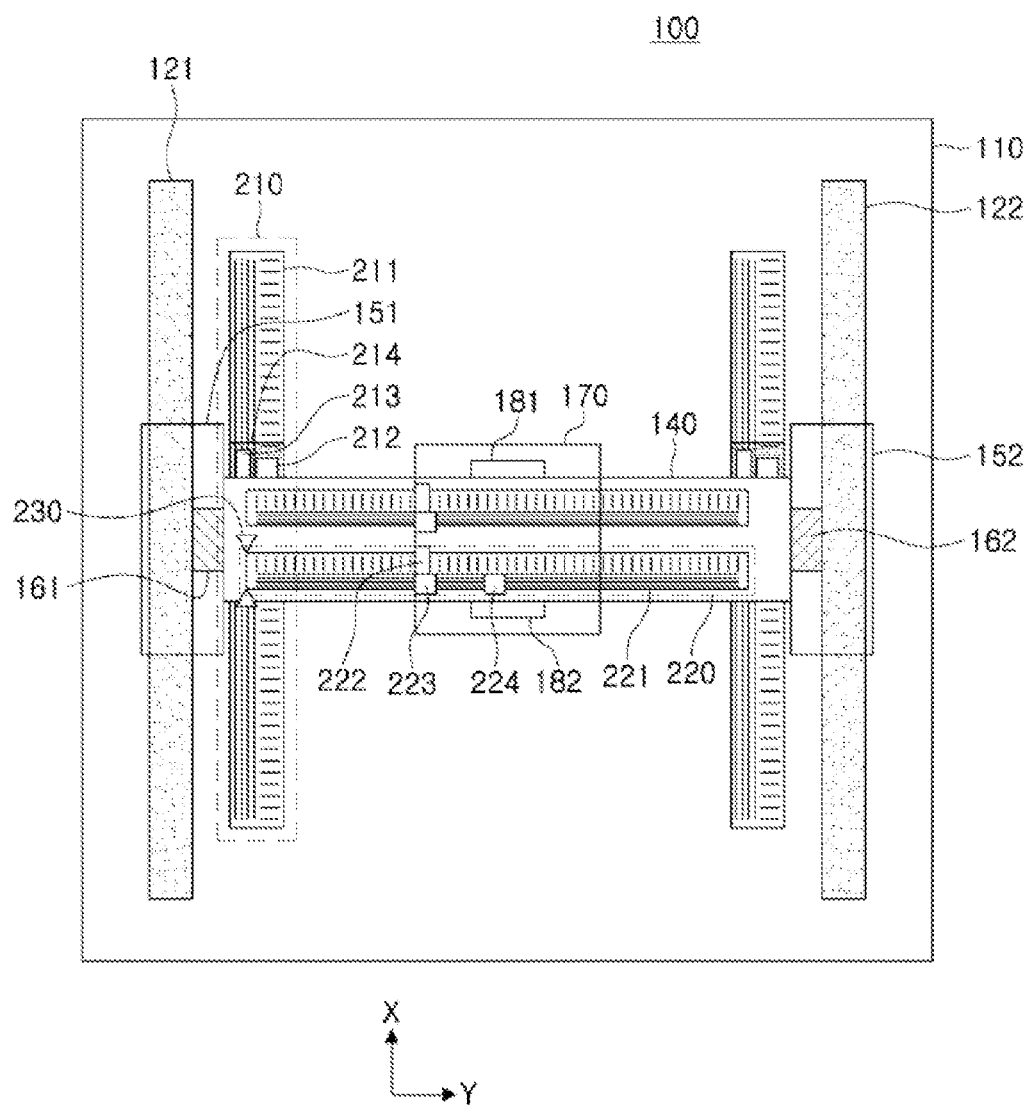
FIG. 1 is a schematic view of a system for compensating dynamic and thermal deformity errors of a linear motion single-plane gantry stage in real time according to an example embodiment of the present invention.

Example embodiments of the present invention are described in more detail with reference to the appended Figures. Components having the same or similar functions are referred to by the same reference numerals.

It should be understood that the expression that a certain part is connected to another part refers not only a direct connection but also an indirect connection through another component. Furthermore, the expression of including a certain part refers to the inclusion of additional components, unless described to the contrary.

Figure 2:
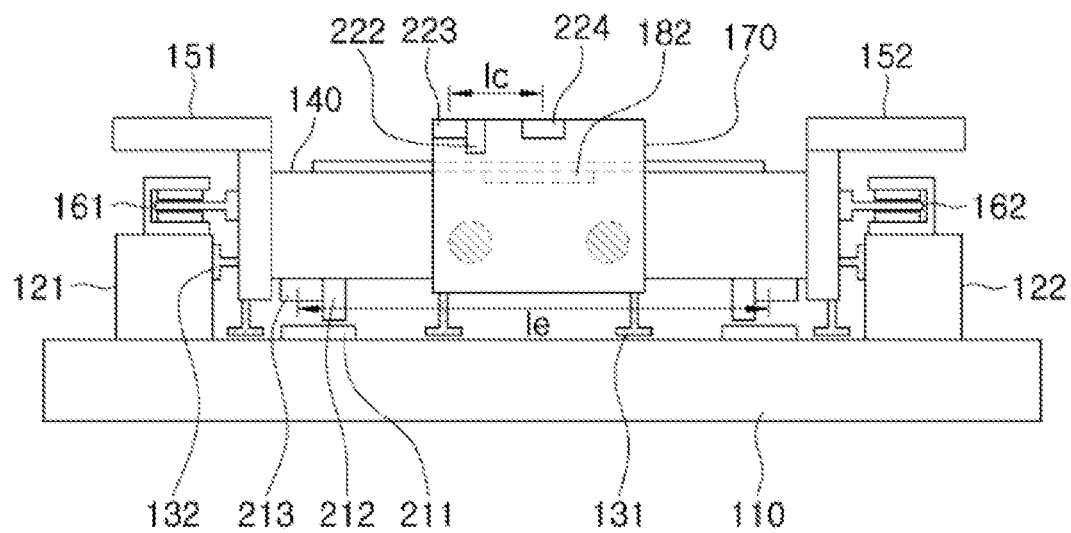
FIG. 2 is a front view of a system for compensating dynamic and thermal deformity errors of a linear motion single-plane gantry stage in real time according to an example embodiment of the present invention.

FIG. 1 schematically illustrates a system for compensating dynamic and thermal deformity errors of a linear motion single-plane gantry stage in real time according to an example embodiment of the present invention, and FIG. 2 is a front view of a system for compensating dynamic and thermal deformity errors of a linear motion single-plane gantry stage in real time according to an example embodiment of the present invention.

Referring to FIGS. 1 and 2, a linear motion single-plane gantry stage 100 on which a system 200 for compensating dynamic and thermal deformity errors in real time is mounted includes a base 110 and two linear edge beams 121, 122 respectively positioned in both sides of the top of the base 110, which support a plurality of vertical air bearings 131 and a plurality of horizontal air bearings 132 for supporting an X-axially and Y-axially movable assembly. In this case, the position of the vertical air bearings 131 and the horizontal air bearings 132 can be determined based both on the cost function for improving the control bandwidth and on the view of mechanical design for improving the intrinsic frequency of the system.

The X-axial motion is performed by an X-axially movable gantry beam 140. The X-axially movable gantry beam 140 is held by two moving carriages 151, 152 supported by a plurality of the vertical air bearings 131 and a plurality of the horizontal air bearings 132, and the two moving carriages 151, 152 are X-axially driven by two drive motors 161, 162. In this case, one (hereinafter referred to as a master shaft) of the two linear edge beams 121 and 122 has a greater stiffness than the other (hereinafter referred to as a slave shaft). In other words, the moving carriage 151 of the master shaft is firmly mounted by the vertical and the horizontal air spring 131 and 132.

The Y-axial motion is performed by an Y-axially movable slider 170 moving along the X-axially movable gantry beam 140, and the Y-axially movable slider 170 is Y-axially driven by two drive motors 181, 182.

Figure 5:
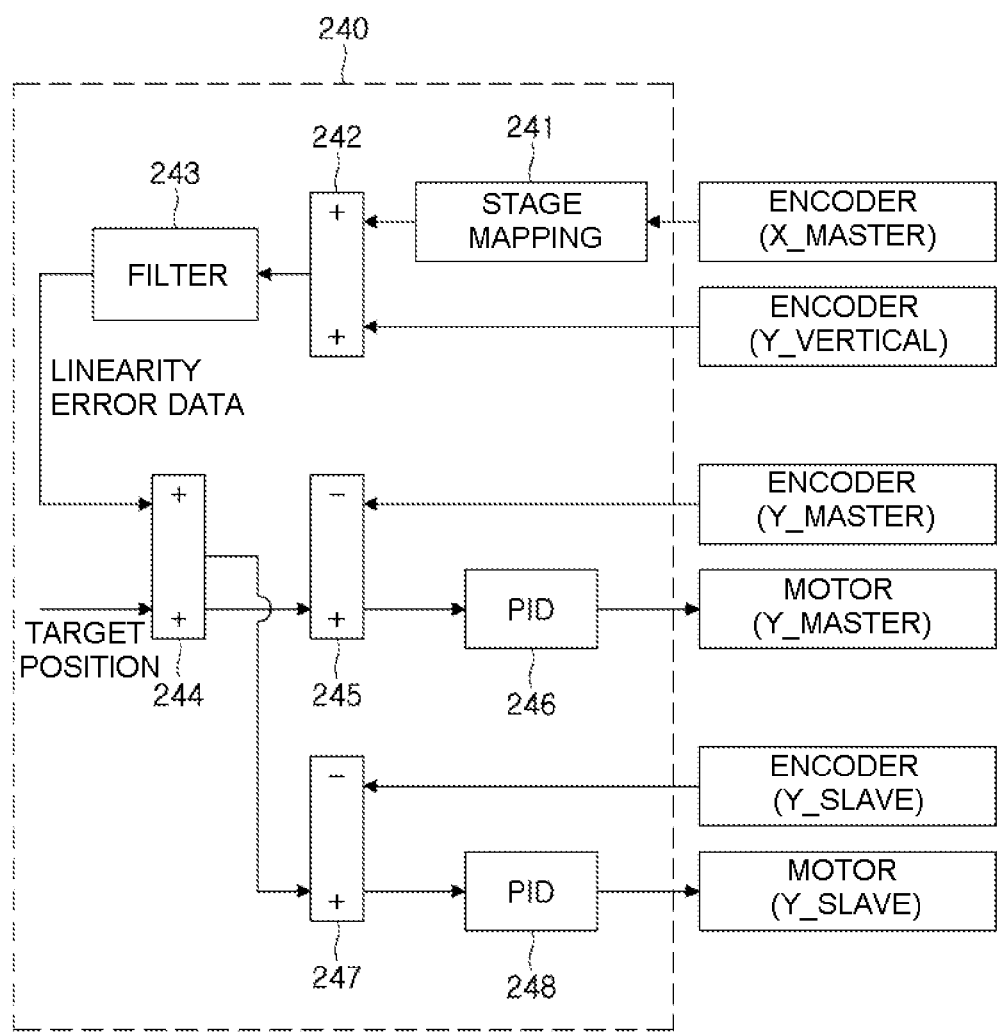
FIG. 5 is a block diagram illustrating the linearity error compensation algorithm by a system for compensating dynamic and thermal deformity errors of a linear motion single-plane gantry stage in real time according to an example embodiment of the present invention.
Figure 6:
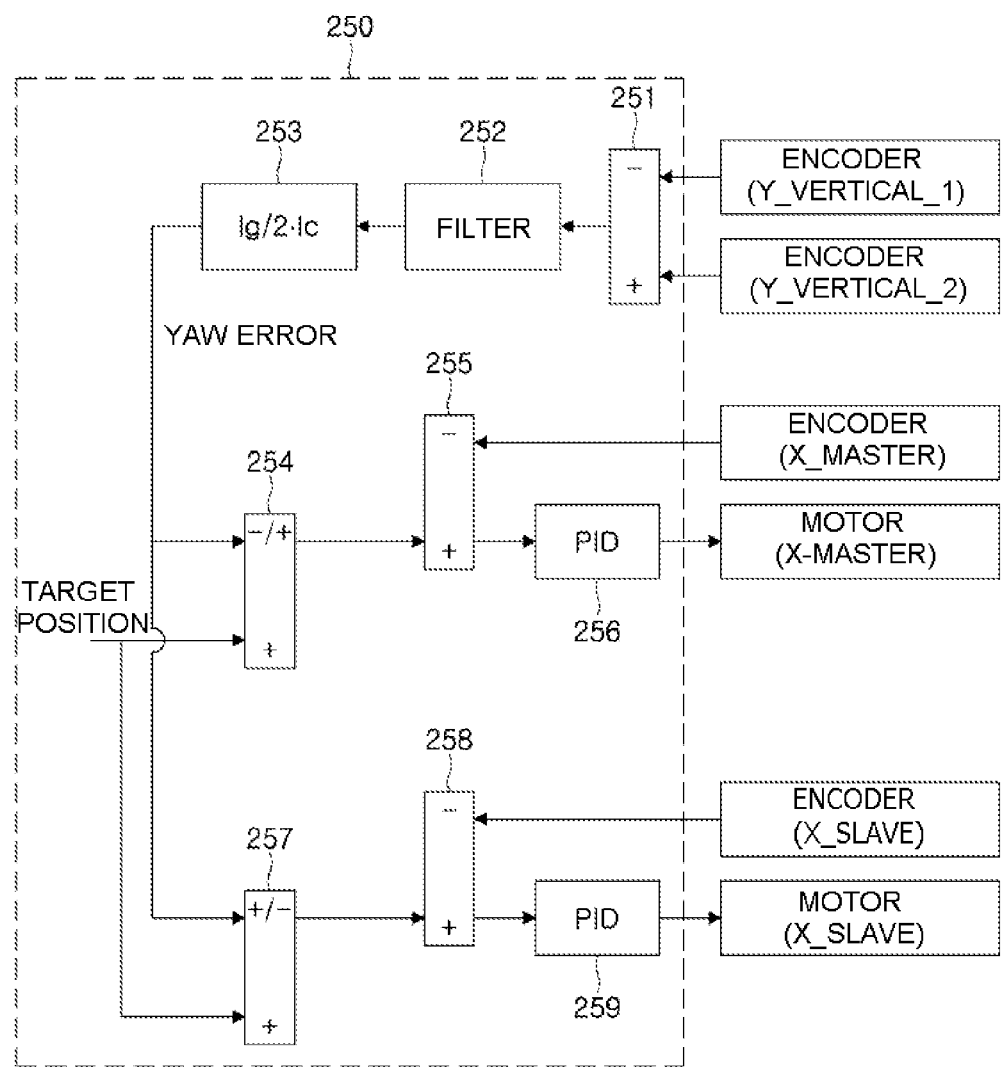
FIG. 6 is a yaw error compensation algorithm by a system for compensating dynamic and thermal deformity errors of a linear motion single-plane gantry stage in real time according to an example embodiment of the present invention.

The system 200 for compensating dynamic and thermal deformity errors in real time which is mounted on the linear motion single-plane gantry stage 100 includes a two-dimensional position measuring unit 210 for providing an X-axial feedback, a two-dimensional position measuring unit 220 for providing an Y-axial feedback, a thermal fixing point 230, and a compensation control unit (see FIGS. 5 and 6).

The two-dimensional position measuring unit 210 for providing an X-axial feedback is provided to each of the two linear edge beams 121, 122 so as to measure an X-axial motion, and includes a two-dimensional encoder scale 211, a motional direction encoder head 212, a vertical direction encoder head 213, and an encoder mounting block 214.

The two-dimensional encoder scale 211 is mounted on the base 110 at both ends of the X-axially movable gantry beam 140 to measure an X-axial motion, and as described below with reference to FIG. 3, includes a two-dimensional lattice to make a measurement both in the motional direction and in the vertical direction.

The motional direction encoder head 212 and the vertical direction encoder head 213 are adapted to measure respectively the displacement in the motional direction and in the vertical direction from the two-dimensional lattice of the two-dimensional encoder scale 211.

The encoder mounting block 214 is adapted to mount the motional direction encoder head 212 and the vertical direction encoder head 213 on the X-axially movable gantry beam 140.

The two-dimensional position measuring unit 220 for a Y-axial feedback is adapted to measure a Y-axial motion of the Y-axially movable slider 170, and includes a two-dimensional encoder scale 221, a motional direction encoder head 222, a vertical direction encoder head 223, and an additional vertical direction encoder head 224 for measuring a yaw error.

The two-dimensional encoder scale 221 is mounted on each of both sides of the X-axially movable gantry beam 140 to measure a Y-axial motion, and as described below with reference to FIG. 3, includes a two-dimensional lattice to make a measurement both in the motional direction and in the vertical direction.

The motional direction encoder head 222 and the vertical direction encoder head 223 are adapted to measure respectively the displacement in the motional direction and in the vertical direction from the two-dimensional lattice of the two-dimensional encoder scale 221.

Also, an additional vertical encoder head 224 is provided to measure a yaw during Y-axial movement. A specific method of measuring a yaw by using the vertical encoder head 224 is described below with reference to FIG. 4. A measured yaw error may be compensated for by using two servo shafts including the drive motors 161, 162 and the two motional encoder heads 212.

The thermal fixing point 230 is provided as a thermal reference for a thermal expansion of the X-axially movable gantry beam 140, fixedly positioned at one end of the two-dimensional encoder scale 221 included in the two-dimensional position measuring unit 220 for a Y-axial feedback and immediately above the vertical direction encoder head 213 included in the two-dimensional position measuring unit 210 for an X-axial feedback. Accordingly, only at the one end of the two-dimensional encoder scale 221 is provided a thermal offset readily measured by the single vertical direction encoder head 213. In addition, the two-dimensional encoder scale 221 may be made of a material with a low CTE (coefficient of thermal expansion) such as Zerodur, thus keeping a high accuracy even under a great thermal change throughout the processing region.

The measured value by the vertical direction encoder head 213 of the two-dimensional position measuring unit 210 for X-axial feedback is used to provide in real time a signal for compensating both a dynamic linearity error generated upon X-axially driving toward the Y-axially movable slider 170 driven by two servo shafts including drive motors 181, 182 and the two motional direction encoder heads 222 and a thermal offset error generated according to a temperature change.

Figure 3:
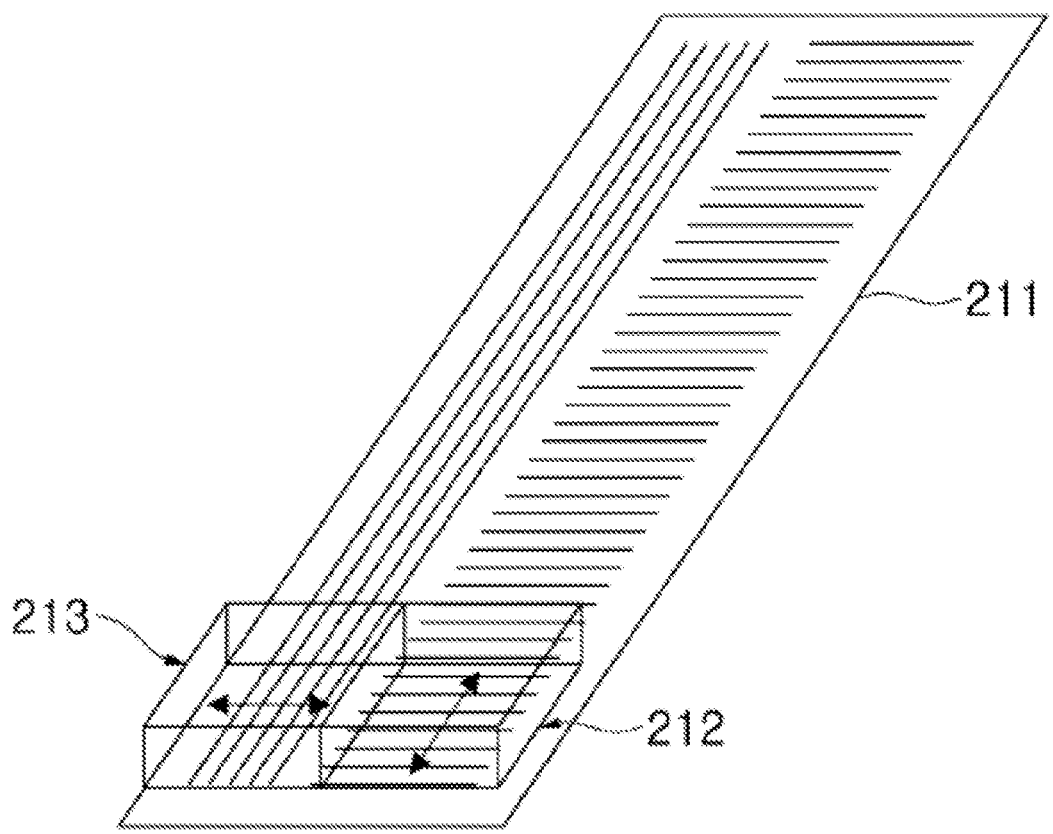
FIG. 3 illustrates the structure of a two-dimensional position measuring unit provided in a system for compensating dynamic and thermal deformity errors of a linear motion single-plane gantry stage in real time according to an example embodiment of the present invention.

FIG. 3 schematically illustrates the structure of the two-dimensional position measuring unit provided in a system for compensating dynamic and thermal deformity errors of a linear motion single-plane gantry stage in real time.

As illustrated in FIG. 3, the two-dimensional encoder scale 211 includes a two-dimensional lattice for making a measurement both in the motional direction and in the vertical direction. And in the two-dimensional encoder scale 211, the motional encoder head 212 is arranged on the motional direction measurement lattice part, and the vertical direction encoder head 213 on the vertical direction measurement lattice part.

The motional direction encoder head 212 and the vertical direction encoder head 213 measure accuracy and linearity respectively according to the motional direction and the vertical direction to provide the result to the compensation control unit for a feedback.

Figure 4:
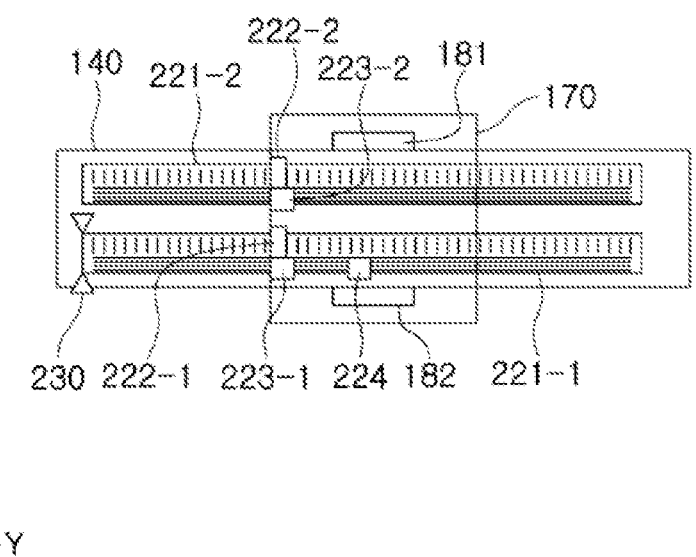
FIG. 4 illustrates the detailed structure of a Y-axially movable slider of a system for compensating dynamic and thermal deformity errors of a linear motion single-plane gantry stage in real time according to an example embodiment of the present invention.

FIG. 4 illustrates in detail the structure of the Y-axially movable slider in a system for compensating dynamic and thermal deformity errors of a linear motion single-plane gantry stage in real time.

Referring to FIG. 4, two two-dimensional encoder scales 221-1, 221-2 may be mounted on both sides of the X-axially movable gantry beam 140.

One two-dimensional encoder scale 221-1 includes a motional direction encoder head 222-1, a vertical direction encoder head 223-1, and an additional vertical direction encoder head 224, while the other two-dimensional encoder scale 221-2 includes a motional direction encoder head 222-2, and a vertical direction encoder head 223-2.

In this case, a yaw error of the Y-axially movable slider may be measured based on the relative distance between the vertical direction encoder head 223-1 and the additional vertical direction encoder head 224.

FIG. 5 illustrates the linearity error compensation algorithm by a system for compensating dynamic and thermal deformity errors of a linear motion single-plane gantry stage in real time.

Referring to FIG. 5, the control unit 240 of the system 200 for compensating dynamic and thermal deformity errors in real time performs a stage mapping 241 by receiving a signal from the motional direction encoder head of the X-axial master shaft, and adds the result to a signal (namely, measured linearity error) received from the vertical direction encoder head of the X-axial master shaft in step 242.

Then, the output signal of step 242 is filtered through step 243, updating the control loop of the Y-axial master and slave shaft as a reference signal for a linearity error. In this case, the filtering of the output signal from step 242 is made by using a low pass filter so as to eliminate high frequency noise components, thus producing a low frequency linearity error signal. The filter parameter can be optimized considering the reaction force of the moving slider, the stage dynamic response, and the control bandwidth of the moving slider during the dynamic compensation process.

Thereafter, the control loop of the Y-axial master and the slave shaft subtracts respectively the signal received from the motional direction encoder head of the Y-axial master shaft and the signal received from the motional direction encoder head of the Y-axial slave shaft from the value obtained by adding the target position signal 244 and the reference signal for the linearity error in steps 245, 247 so as to generate respective control signals delivered through respective PID (proportional-integral-derivative) controllers 246, 247 to the drive motors for the Y-axial master shaft and the Y-axial slave shaft.

Although the linearity error compensation algorithm is described with reference to FIG. 5, the thermal deformity error compensation may also performed in the same manner as the linearity error compensation algorithm.

FIG. 6 illustrates a yaw error compensation algorithm by a system for compensating dynamic and thermal deformity errors of a linear motion single-plane gantry stage in real time.

Referring to FIG. 6, the control unit 250 of the system 200 for compensating dynamic and thermal deformity errors in real time calculates the difference between the signal received from the vertical direction encoder head of the Y-axial master shaft and the signal received from the additional vertical direction encoder head in step 251.

Then, the resulting output signal is filtered through step 252. In this case, the filtering of the output signal is made by using a low pass filter so as to eliminate the high frequency noise component due to the motions of the moving slider, thus producing a low frequency yaw error signal. The filter parameter can be optimized considering the reaction force of the gantry beam, the stage dynamic response, and the control bandwidth of the gantry beam during the desired scan motion and the dynamic compensation process.

Thereafter, the filtered result is scaled using a factor lg/(2·lc) in step 253. In this case, lc is the distance between the vertical direction encoder head of the Y-axial master shaft and the additional vertical direction encoder head, and lg the distance between the vertical direction encoder head of the X-axial master shaft and the vertical encoder head of the slave shaft (see FIG. 2).

Then, the output signal of step 253 updates the control loop of the X-axial master and the slave shaft as a reference signal for a yaw error.

Thereafter, the control loop of the X-axial master and the slave shaft subtracts respectively the signal received from the motional direction encoder head of the X-axial master shaft and the signal received from the motional direction encoder head of the X-axial slave shaft in steps 255, 258 from the value obtained respectively by adding and subtracting the reference signal for the yaw error to and from the target position signal (or vice versa) in steps 254, 257 so as to generate respective control signals delivered through respective PID (proportional-integral-derivative) controllers 256, 259 to the drive motors for the X-axial master shaft and the X-axial slave shaft.

The linear motion single-plane gantry stage using the above-described system for compensating dynamic and thermal deformity errors may be used in all apparatuses for manufacturing, measuring, or inspecting a semiconductor, LCD, LED, OLED, AMOLED, PCB, solar cell, CNT, ceramic material, chemical material, textile material, bio material, etc.

It should be understood that the foregoing description is not intended to be limiting and that substitutions, modifications, and alterations may be made without departing from the spirit and scope hereof.

LIST OF REFERENCE NUMERALS

100 Linear Motion Single-Plane Gantry Stage
110 Base
121, 122 Linear Edge Beam
131 Vertical Air Bearing
132 Horizontal Air Bearing
140 X-Axially Movable Gantry Beam
151, 152 Movable Carriage
161, 162 Drive Motor
170 Y-Axially Movable Slider
181, 182 Drive Motor
200 System for Compensating Dynamic and Thermal Deformity Errors in Real Time
210 Two-Dimensional Position Measuring Unit for X-axial Feedback
211 Two-Dimensional Encoder Scale
212 Motional Direction Encoder Head
213 Vertical Direction Encoder Head
214 Encoder Mounting Block
220 Two-Dimensional Position Measuring Unit for Y-axial Feedback
221 Two-Dimensional Encoder Scale
222 Motional Direction Encoder Head
223, 224 Vertical Direction Encoder Head
230 Thermal Fixing Point

What is claimed is:

1. A system for compensating dynamic and thermal deformity errors of a linear motion single-plane gantry stage in real time, comprising:
a first two-dimensional position measurement unit arranged in each of two linear edge beams respectively positioned on both sides of the linear motion single-plane gantry stage adapted to measure a position of an X-axially movable gantry beam to provide feedback of X-axial motion thereof;

a second two-dimensional position measurement unit adapted to measure a position of an Y-axially movable slider that is movable on the X-axially movable gantry beam to provide feedback of an Y-axial motion thereof;

a thermal fixing point provided as a thermal reference for measurement of thermal expansion of the X-axially movable gantry beam; and a compensation control unit adapted to control an error motion of the linear motion single-plane gantry stage in real time in accordance with measurement of dynamic and thermal deformity errors based on data received from the first and second two-dimensional position measuring units;

wherein the first two-dimensional position measurement unit includes:

a first two-dimensional encoder scale mounted on a base below each of both ends of the X-axially movable gantry beam including a two-dimensional lattice adapted to measure both in a motional direction and in a vertical direction;

a first motional direction encoder head arranged on a motional direction measurement lattice part of the first two-dimensional encoder scale adapted to measure a motional direction displacement;

a first vertical direction encoder head arranged on a vertical direction measurement lattice part of the first two-dimensional encoder scale adapted to measure a vertical direction displacement; and an encoder mounting block adapted to mount the motional direction encoder head and the vertical direction encoder head on the X-axially movable gantry beam.

2. The system according to claim 1, wherein the second two-dimensional position measurement unit includes:

a second two-dimensional encoder scale mounted on each of both sides of the X-axially movable gantry beam in the Y-axial motional direction including a two-dimensional lattice adapted to measure both in the motional direction and in the vertical direction;

a second motional encoder head arranged on a motional direction measurement lattice part of the second two-dimensional encoder scale adapted to measure a motional direction displacement; and a second vertical direction encoder head arranged on a vertical direction measurement lattice part of the second two-dimensional encoder scale.

3. The system according to claim 2, wherein the compensation control unit is adapted to perform a stage mapping for a signal received from the first motional direction encoder head to generate a resulting signal added to a signal received from the vertical direction encoder head, and to filter the added result to generate a filtered result for updating an Y-axial control loop as a reference signal for a linearity error.

4. The system according to claim 3, further comprising a low-pass filter adapted to eliminate a high frequency noise component to produce only a low frequency linearity error signal.

5. The system according to claim 2, wherein the second two-dimensional position measurement unit further includes a third vertical direction encoder head separated from the second vertical direction encoder head, the third vertical direction encoder head arranged on the vertical direction measurement lattice part of the second two-dimensional encoder scale and adapted to measure a vertical direction displacement.

6. The system according to claim 5, wherein a yaw error of the Y-axially movable slider is measurable based on a relative distance between the second vertical direction encoder head and the third vertical direction encoder head arranged on the second two-dimensional encoder scale mounted on one side of the X-axially movable gantry beam in the Y-axial motional direction.

7. The system according to claim 5, wherein the compensation control unit is adapted to calculate a difference between a signal received from the second vertical direction encoder head and a signal received from the third vertical direction encoder head and to filter the difference to generate a filtered result scaled by using a factor lg/(2·lc) to update an X-axial control loop as a reference signal for a yaw error, the second and third vertical direction encoder heads being arranged on the second two-dimensional encoder scale mounted on one side of the X-axially movable gantry beam in the Y-axial motional direction;

wherein lc represents a distance between the second vertical direction encoder head and the third vertical direction encoder head arranged on the second two-dimensional encoder scale mounted on one side of the X-axially movable gantry beam in the Y-axial motional direction; and wherein lg represents a distance between the first vertical direction encoder heads respectively arranged on the first two-dimensional encoder scale respectively mounted on a base below both ends of the X-axially movable gantry beam.

8. The system according to claim 7, further comprising a low-pass filter adapted to eliminate a high frequency noise component to produce only a low frequency yaw error signal.

9. A stage apparatus, comprising the system for compensating dynamic and thermal deformity errors of a linear motion single-plane gantry stage in real time according to claim 1.

10. The stage apparatus according to claim 9, wherein the apparatus is arranged as an apparatus for manufacturing, measuring, and/or inspecting a semiconductor, an LCD, an LED, an OLED, an AMOLED, a PCB, a solar cell, a CNT, a ceramic material, a chemical material, a textile material, and/or a bio material.

11. A system, comprising the stage apparatus according to claim 9, adapted to manufacture a semiconductor, an LCD, an LED, an OLED, an AMOLED, a PCB, a solar cell, a CNT, a ceramic material, a chemical material, a textile material, and/or bio material.

12. A system, comprising the stage apparatus according to claim 9, adapted to measure a semiconductor, an LCD, an LED, an OLED, an AMOLED, a PCB, a solar cell, a CNT, a ceramic material, a chemical material, a textile material, and/or a bio material.

13. A system, comprising the stage apparatus according to claim 9, adapted to inspect a semiconductor, an LCD, an LED, an OLED, an AMOLED, a PCB, a solar cell, a CNT, a ceramic material, a chemical material, a textile material, and/or or bio material.

* * * * *